United States Patent
Wengler et al.

(10) Patent No.: US 12,312,067 B2
(45) Date of Patent: May 27, 2025

(54) DEADBAND CONTROL FOR AN AIRCRAFT

(71) Applicant: Lockheed Martin Corporation, Bethesda, MD (US)

(72) Inventors: Leonard Wengler, Palm City, FL (US); Matthew T. Luszcz, Hamden, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 191 days.

(21) Appl. No.: 18/100,762

(22) Filed: Jan. 24, 2023

(65) Prior Publication Data

US 2023/0234697 A1    Jul. 27, 2023

Related U.S. Application Data

(60) Provisional application No. 63/302,422, filed on Jan. 24, 2022.

(51) Int. Cl.
*B64C 13/04* (2006.01)
*B64C 13/50* (2006.01)

(52) U.S. Cl.
CPC ........ *B64C 13/0421* (2018.01); *B64C 13/503* (2013.01)

(58) Field of Classification Search
CPC .......................... B64C 13/0421; B64C 13/503
See application file for complete search history.

(56) References Cited

U.S. PATENT DOCUMENTS

| | | | |
|---|---|---|---|
| 6,695,264 B2 | 2/2004 | Schaeffer et al. | |
| 8,025,256 B2 | 9/2011 | Miller et al. | |
| 8,725,321 B2 * | 5/2014 | Hagerott | B64C 9/04 701/4 |
| 10,011,348 B1 * | 7/2018 | Wong | B64C 29/0025 |
| 2010/0145555 A1 * | 6/2010 | Hagerott | B64C 13/507 701/3 |
| 2014/0288731 A1 * | 9/2014 | Hagerott | B64C 13/341 701/3 |
| 2015/0191241 A1 * | 7/2015 | Antraygue | B64C 13/0421 701/3 |
| 2016/0266582 A1 * | 9/2016 | Carter | G01C 23/00 |
| 2017/0267330 A1 * | 9/2017 | Hreha | B64C 13/044 |
| 2021/0173391 A1 * | 6/2021 | Parazynski | G05D 1/101 |
| 2022/0261023 A1 * | 8/2022 | Dasgupta | H02J 3/32 |
| 2023/0202651 A1 * | 6/2023 | Christensen | B64C 13/18 244/7 R |
| 2023/0234697 A1 * | 7/2023 | Wengler | B64C 27/56 701/3 |

* cited by examiner

*Primary Examiner* — Peter D Nolan
*Assistant Examiner* — Wae L Louie
(74) *Attorney, Agent, or Firm* — Michael Best & Friedrich LLP

(57) ABSTRACT

A method of operating an aircraft based on movement of a control stick. The method includes creating a deadband of the control stick, where the deadband extends between the central axis and a first angular distance from the central axis, controlling, in response to the control stick being positioned within the deadband, the aircraft according to a first control mode, controlling, in response to the control stick being positioned outside of the deadband, the aircraft according to a second control mode, and adjusting a size of the deadband such that the deadband extends between the central axis and a second angular distance from the central axis.

20 Claims, 7 Drawing Sheets

DEADBAND CONTROL FOR AN AIRCRAFT

CROSS-REFERENCE TO RELATED PATENT APPLICATION

The present application claims priority to U.S. Provisional Patent Application No. 63/302,422, filed Jan. 24, 2022, the entire contents of which are incorporated by reference herein.

FIELD OF INVENTION

Embodiments described herein relate to aircraft controls and, in particular, to methods for providing feedback via a control stick.

BACKGROUND

A dual, rotary wing aircraft generally includes an airframe with an extending tail. A dual, counter rotating, coaxial main rotor assembly is located at the airframe and rotates about a main rotor axis. The main rotor assembly includes an upper rotor assembly driven in a first direction (e.g., counter-clockwise) about the main rotor axis and a lower rotor assembly driven in a second direction about the main rotor axis opposite to the first direction (i.e., counter rotating rotors). Each of the upper rotor assembly and the lower rotor assembly includes a plurality of rotor blades secured to a rotor hub. The aircraft may further include a translational thrust system located at the extending tail to provide translational thrust (forward or rearward).

Some rotary wing aircrafts, such as dual rotary wing aircraft described above, are controlled via a cyclic stick or other type of control stick. Movement of the control stick may be used by the pilot to command operation of the aircraft, such as controlling an attitude parameter, a rate parameter, etc. At times the controller of the aircraft will also help to maintain or control one or more parameter of the aircraft.

SUMMARY

Embodiments described herein provide a control system for an aircraft including a control stick extending along a central axis when in a neutral position defined and pivotable to a plurality of angular positions relative to the central axis, and a controller coupled to the control stick, where the controller includes an electronic processor and a memory. The controller is configured to create a deadband of the control stick, where the deadband extends between the central axis and a first angular distance from the central axis, control the aircraft according to the first control mode when the control stick is positioned within the deadband, control the aircraft according to the second control mode when the control stick is positioned outside of the deadband, and adjust a size of the deadband such that the deadband extends between the central axis and a second angular distance from the central axis.

Embodiments described herein provide a method of operating an aircraft based on movement of a control stick. The method includes creating a deadband of the control stick, where the deadband extends between the central axis and a first angular distance from the central axis, controlling, in response to the control stick being positioned within the deadband, the aircraft according to a first control mode, controlling, in response to the control stick being positioned outside of the deadband, the aircraft according to a second control mode, and adjusting a size of the deadband such that the deadband extends between the central axis and a second angular distance from the central axis.

Embodiments described herein provide a method for controlling an aircraft via a control stick having an actuator. The method includes controlling, in response to the control stick being positioned within a deadband, the aircraft according to a first control mode, controlling, in response to the control stick being positioned outside of the deadband, the aircraft according to a second control mode, detecting when an actuator of the control stick is actuated, deactivating, in response to the actuator being actuated, the deadband of the control stick, and controlling, in response to the deadband being removed, the aircraft according to the second control mode.

Other aspects will become apparent by consideration of the detailed description and accompanying drawings.

DETAILED DESCRIPTION

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

It should be noted that a plurality of hardware and software-based devices, as well as a plurality of different structural components may be utilized to implement the embodiments described herein or portions thereof. In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects described herein may be implemented in software (stored on non-transitory computer-readable medium) executable by one or more processors. As such, it should be noted that a plurality of hardware and software-based devices, as well as a plurality of different structural components may be used to implement the embodiments described herein. For example, "controller," "control unit," and "control assembly" described in the specification may include one or more processors, one or more memory modules including non-transitory computer-readable medium, one or more input/output interfaces, and various connections (for example, a system bus) connecting the components.

Figure 1:
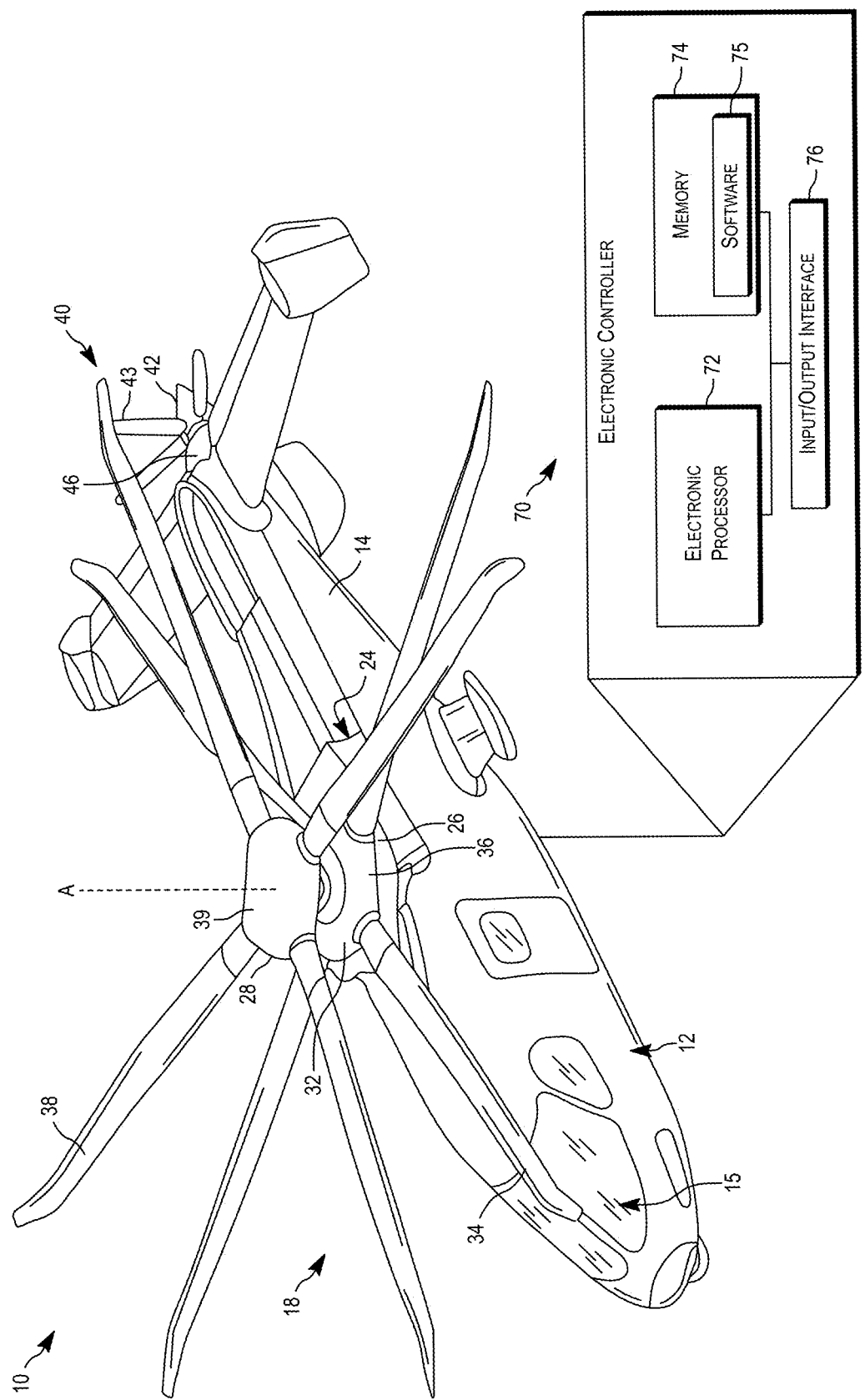
FIG. 1 depicts a rotary wing aircraft according to an exemplary embodiment.

Referring now to the figures, FIG. 1 illustrates a rotary wing aircraft 10 according to some embodiments. The rotary wing aircraft 10 shown in FIG. 1 is a co-axial rotary wing aircraft. While FIG. 1 provides an example of a rotary wing aircraft, systems described herein may also be utilized in different types of aircrafts. For example, systems described herein may be utilized in a turboprop aircraft, a piston aircraft, a jet, a fixed wing aircraft, a transport aircraft, or some other suitable aircraft or air vehicle.

The aircraft 10 includes an airframe 12 with an extending tail 14. The aircraft 10 includes a dual, counter rotating, co-axial main rotor assembly 18 that rotates about an axis A. The airframe 12 includes a cockpit 15 having one or more seats for flight crew (e.g., pilot and co-pilot) and optional passengers.

The main rotor assembly 18 is driven by a power source, such as, for example, one or more motors 24 via a main rotor gearbox 26. The one or more motors 24 can include an electric motor, a piston engine, a gas turbine, or other device for providing motion.

The main rotor assembly 18 includes an upper rotor assembly 28 driven in a first direction (e.g., counter-clockwise) about the main rotor axis A, and a lower rotor assembly 32 driven in a second direction (e.g., clockwise) about the main rotor axis A, wherein the second direction is opposite to the first direction (i.e., to provide two counter rotating rotors). The upper rotor assembly 28 includes a first plurality of rotor blades 38 supported by a first rotor hub 39. The lower rotor assembly 32 includes a second plurality of rotor blades 34 supported by a second rotor hub 36. As illustrated in FIG. 1, the aircraft 10 further also includes a pusher-propeller 40 located at the extending tail 14 to provide translational thrust (forward or rearward) for the aircraft 10. In some embodiments, the pusher-propeller 40 includes a propeller 42 including a plurality of propeller blades 43. Although FIG. 1 illustrates the propeller 42 in the context of a pusher-propeller configuration, in other embodiments, the propeller 42 may be a puller-propeller. Similarly, in some embodiments, the propeller 42 may be mounted in a static configuration with respect to the aircraft 10 as illustrated in FIG. 1. However, in other embodiments, the propeller 42 has a variable position, which allows the propeller to provide yaw control in addition to translational thrust. Also, in some embodiments, the aircraft 10 includes more than one pusher-propellers, such as, for example, one positioned on the back left of the aircraft 10 and one positioned on the back right of the aircraft 10.

In some embodiments, the pusher-propeller 40 (i.e., the propeller 42) is connected to and driven by the one or more motors 24 via a propeller gearbox 46. In some embodiments, the propeller gearbox 46 is driven by the main rotor gearbox 26, and the propeller gearbox 46 can be configured to change a gear ratio between the main rotor gearbox 26 and the propeller gearbox 46 to vary, on command, the relative speeds between the main rotor gearbox 26 and the propeller gearbox 46. In such embodiments, the variable gear ratio of the propeller gearbox 46 controls power transmitted from the main rotor gearbox 26 to the propeller gearbox 46. Other configurations for controlling the pusher-propeller 40 are possible, such as, for example, using an engine or power source to drive the pusher-propeller 40 that is separate from the engine or power source used to power the main rotary assembly 18.

As also illustrated in FIG. 1 (in an expanded view), the aircraft 10 includes an electronic controller 70. The electronic controller 70 includes a plurality of electrical and electronic components that provide power, operation control, and protection to the components and modules within the electronic controller 70. The electronic controller 70 includes an electronic processor 72 (such as a programmable electronic microprocessor or similar device) that executes software to control operation of the main rotor assembly 18 and the pusher-propeller 40. In the example illustrated in FIG. 1, the electronic controller 70 also includes memory 74 (for example, non-transitory, machine-readable memory, such as, for example, a hard disk, a CD-ROM, an optical storage device, a magnetic storage device, a ROM, a programmable read-only memory (PROM), an EEPROM, an erasable programmable read-only memory (EPROM), and a Flash memory) and an input-output interface 76.

The electronic processor 72 is communicatively connected to the memory 74 and the input-output interface 76. In some embodiments, the memory 74 stores software 75 executable by the electronic processor 72 to perform the control functionality and associated methods described herein. It should be understood that the electronic controller 70 can include other components, and the configuration illustrated in FIG. 1 is provided as one example. For example, in some embodiments, the electronic controller 70 includes one or more microprocessors, digital signal processors, customized processors and field programmable gate arrays (FPGAs) and unique stored program instructions (including both software and firmware) that controls the one or more processors to implement, in conjunction with certain non-processor circuits, the functionality described herein or a portion thereof. Alternatively, the functionality described herein, or a portion thereof, could be implemented by a state machine that has no stored program instructions, or in one or more application specific integrated circuits (ASICs), in which functionality is implemented as custom logic. Of course, a combination of the two approaches could be used.

Figure 2:
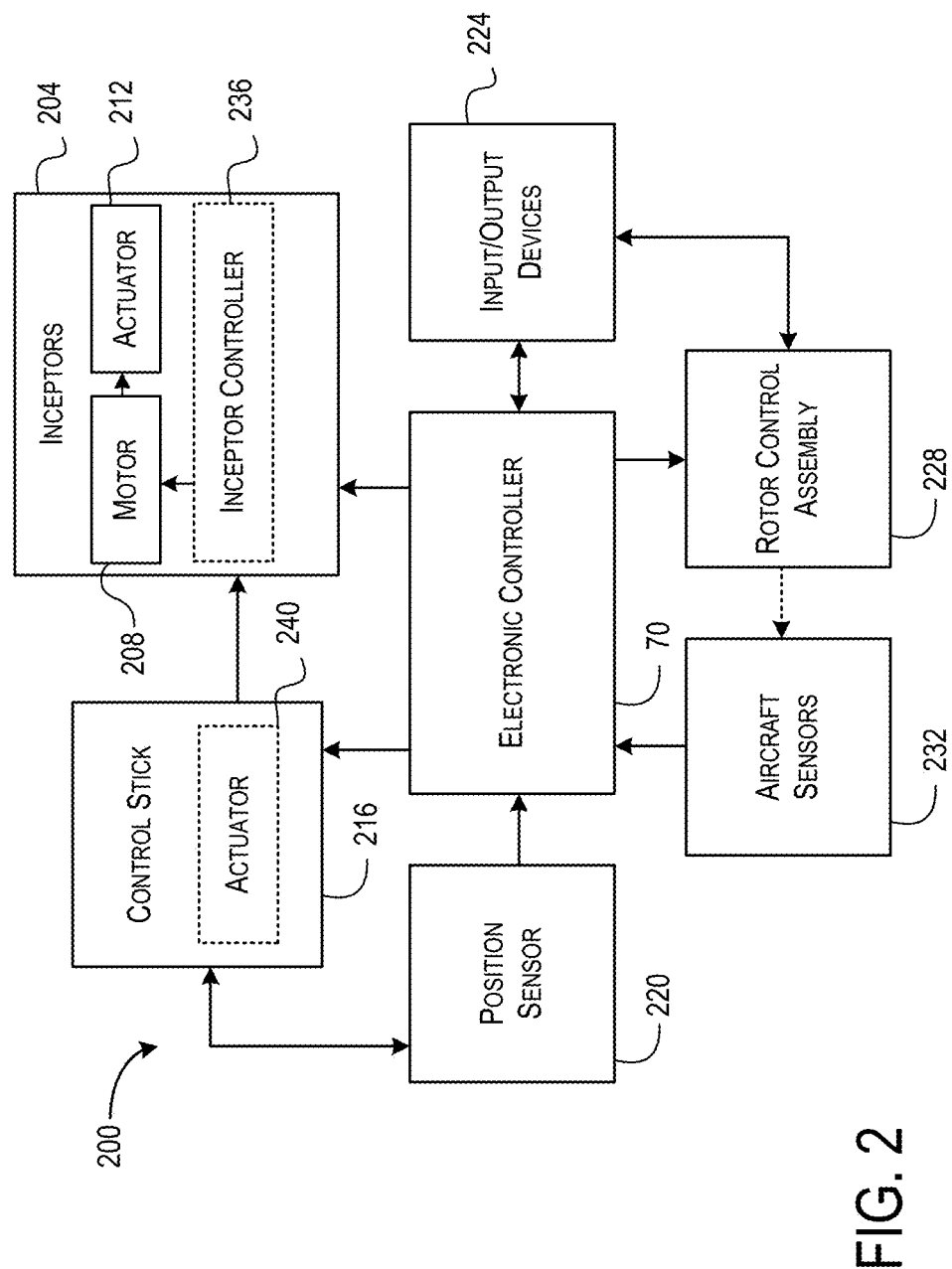
FIG. 2 depicts a control system of the rotary wing aircraft of FIG. 1.

FIG. 2 provides a control system 200 implemented within the aircraft 10 according to some embodiments. The control system 200 includes the electronic controller 70, one or more inceptors 204, a control stick 216, a position sensor 220, input/output devices 224, a rotor control assembly 228, and aircraft sensors 232. The control stick 216 may be, for example, a cyclic stick used for flight command inputs by an operator (e.g., a pilot) of the aircraft 10. As a pilot pushes or pulls the control stick 216, the position sensor 220 detects the displacement and provides a position signal to the electronic controller 70. The electronic controller 70 analyzes the position signal to determine a position of the control stick 216. In some embodiments, the electronic controller 70 analyzes the position signal to determine an amount of displacement of the control stick 216. In other embodiments, the control system 200 does not include a position sensor, but rather, analyzes movement of the control stick 216 via alternative means.

The electronic controller 70 controls the rotor control assembly 228 based on the position of the control stick 216. Specifically, the electronic controller 70 determines one or more output signal based on the position of the control stick 216, and sends the output signal(s) to the rotor control assembly 228 to control the aircraft 10. Based on the control signal, the rotor control assembly 228 may, in turn, control the one or more motors 24, the main rotor gearbox 26, and the propeller gearbox 46. Additionally, as the rotor control assembly 228 is controlled, the plurality of aircraft sensors 232 may each generate signals representing a measured operating characteristic of the aircraft 10 (e.g., altitude, airspeed, pitch roll angle, etc.) and transmits the signal to the electronic controller 70 (directly or indirectly). The electronic controller 70 receives such signals via the input-output interface 76 and these signals can be used as part of the control functionality performed by the electronic processor 72 (through execution of the software 75) to determine the output signal to the control assembly 228. These signals (or data derived therefrom) can also be stored in the memory 74.

Figure 3:
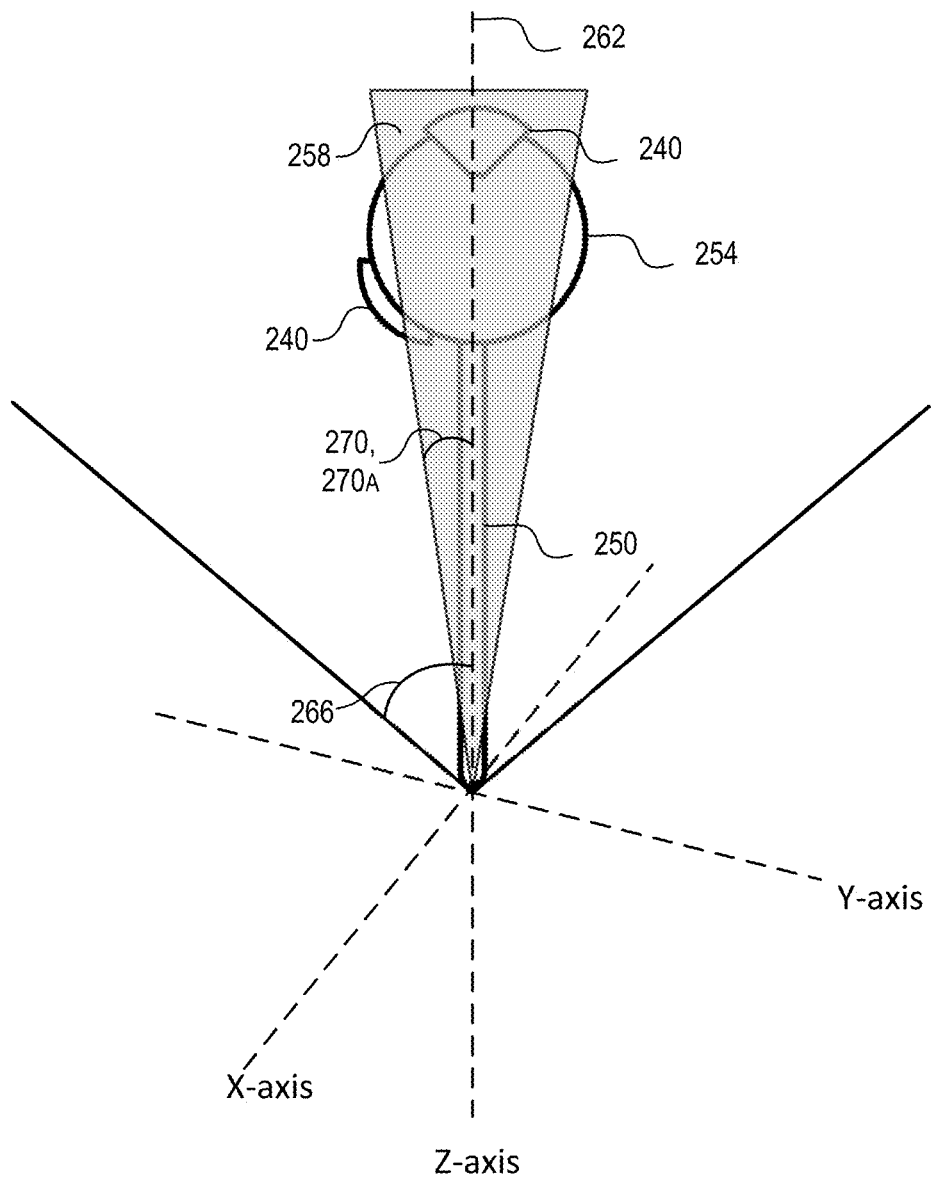
FIG. 3 is a schematic illustration of a control stick with a deadband having a first size.

FIG. 3 provides a schematic view of the control stick 216. The controls stick includes an elongated body 250 with a grip portion 254, which is sized and shaped to be grasped by a pilot. One or more actuators (or buttons 240) may be positioned on the grip portion 254 of the control stick 216. The control stick 216 may extend along a central axis 262 (e.g., an origin defined along the Z-axis) when the control stick is centrally located. The control stick 216 may be pivoted to a plurality of different positions relative to the central axis 262 to control the aircraft 10. In some embodiments, movement of the control stick 216 is continuous between the central axis 262 and a maximum possible displacement to provide an infinite number of positions. In other embodiments, the control stick 216 may have a discrete number of positions. The maximum displacement of the control stick 216 is defined by a maximum angular displacement 266 from the central axis 262, as shown schematically in FIG. 3. When the control stick 216 is positioned at the origin, the control stick 216 is zero degrees from the central axis 262. As will be understood, the control stick 216 may be pivoted to any position within the X-Y plane.

One or more inceptors 204 may be coupled to the control stick 216. The one or more inceptors 204 may be, for example, servomotors, magnetic particle clutches, or the like. In some embodiments each inceptor 204 includes a motor 208 and an actuator 212. As the control stick 216 is displaced, the one or more inceptors 204 may be controlled to provide resistance against the control stick 216. For example, as the control stick 216 begins to move forward, the electronic controller 70 may provide power to the motor 208, which actuates the actuator 212. As the control stick 216 is pushed further forward, the electronic controller 70 provides greater power to the motor 208, increasing the resistance experienced by the control stick 216. In this manner, the resistance provides tactile feedback to a pilot of the control stick 216. In some embodiments, each inceptor 204 includes an inceptor controller 236. The inceptor controller 236 controls the motor 208 based on signals received from the electronic controller 70. In other embodiments, the inceptors 204 may be controlled by one or more shared controller, such as the electronic controller 70.

The amount of resistance applied to the control stick 216 affects how easily displaceable the control stick 216 is from a default position at the origin. The amount of resistance applied against the control stick 216 may be varied under different circumstances or different degrees of displacement of the control stick 216. In some embodiments, the amount of resistance applied to the control stick 216 may vary based on the position of the control stick 216 (i.e., the degree of displacement) relative to the origin. In some embodiments, the amount of resistance applied to the control stick 216 may be greater when operating in certain control modes or different operating modes. Additionally, in some embodiments, the amount of resistance applied to the control stick 216 may be based on a pilot preference.

Figure 4:
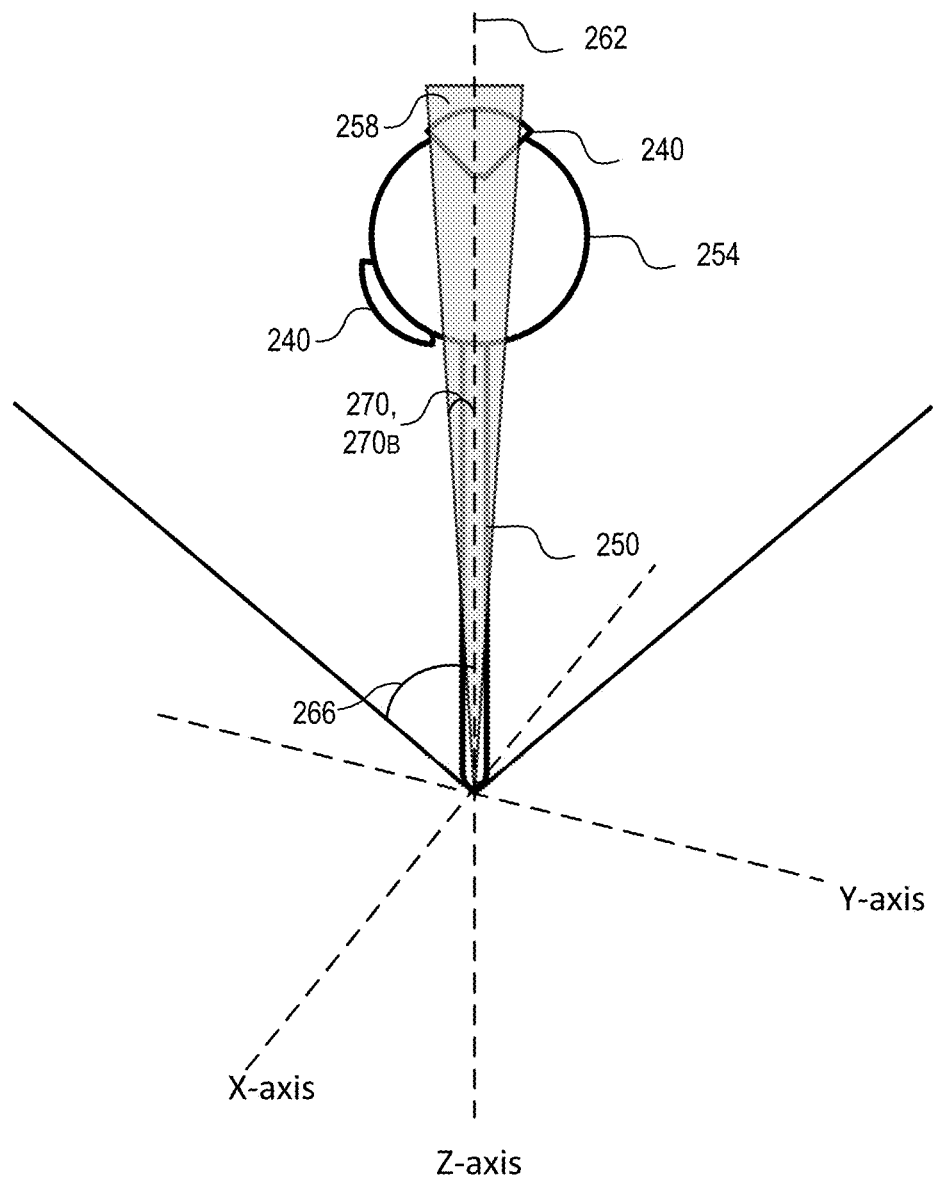
FIG. 4 is a schematic illustration of the control stick of FIG. 3 with a deadband having a second size.
Figure 5:
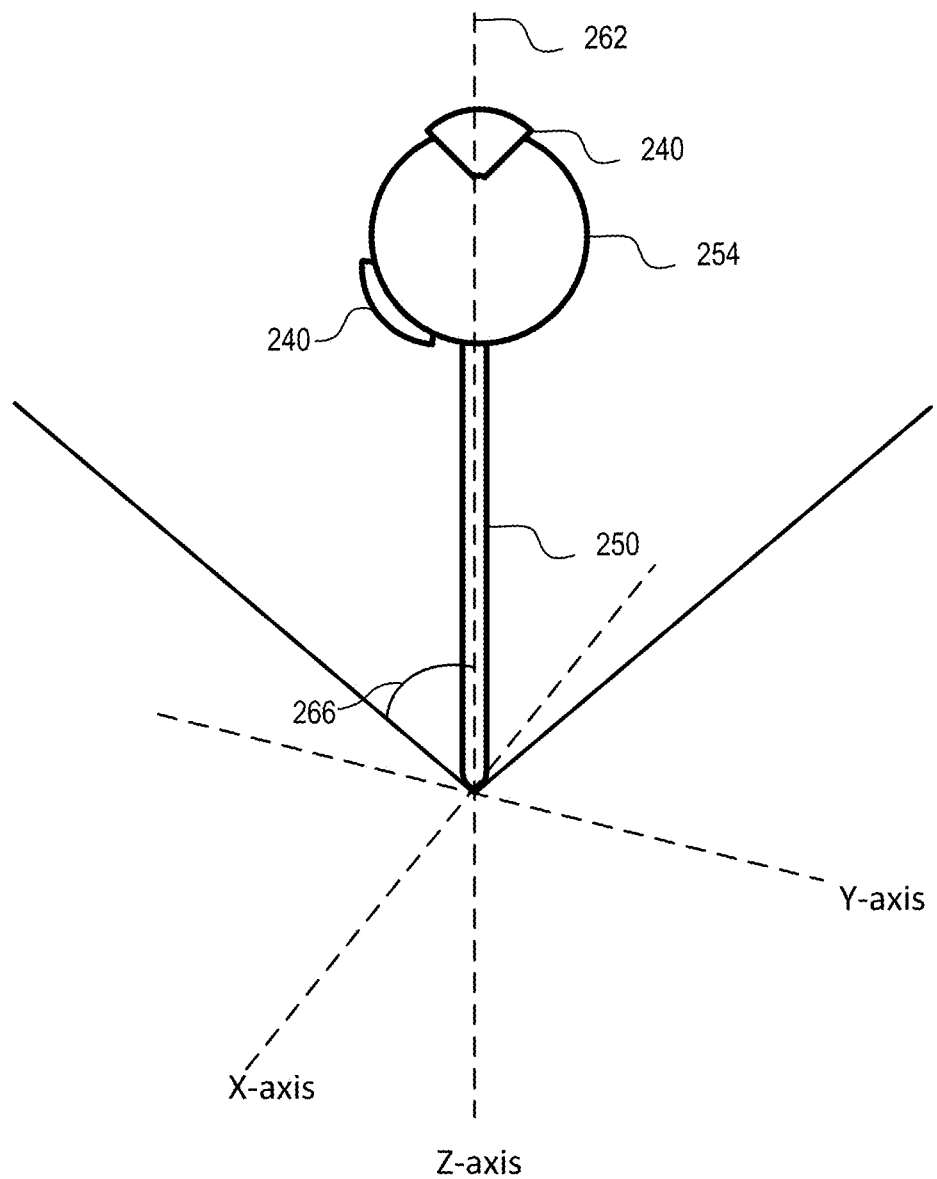
FIG. 5 is a schematic illustration of the control stick of FIG. 3 with a deadband deactivated.

Referring to FIGS. 3-5, the control stick 216 may have a "deadband" or a "deadzone" proximate the default position of the control stick 216 at the origin, which is considered a neutral zone. It should be noted that FIGS. 3-5 are intended to be schematic drawings that are not necessarily drawn to scale. For the sake of illustration, the deadband 258 is shown larger than reality in order to be more easily perceived. The deadband 258 extends from the origin to a predetermined angular distance 270 from the central axis 262. The deadband 258 may be defined by an electronic detent created by the electronic controller 70. The electronic controller 70 may create the electronic detent by controlling the inceptors 204. For example, when the control stick 216 is positioned within the deadband 258, the electronic controller 70 may control inceptors 204 to only apply a small amount of force or no force to the control stick 216. Once the control stick 216 reaches an outer perimeter of the deadband 258, the controller 70 may control the inceptors 204 to increase the force or begin applying a force to the control stick 216. The outer perimeter of the deadband 258 may be defined by a predetermined angular distance 270 of the control stick 216. In other embodiments, the deadband 258 is not defined by an electronic detent.

When positioned within the deadband 258, the control stick 216 is considered at a "zero position" and any movement of the control stick 216 within the deadband 258 does not affect the output of the electronic controller 70. In some embodiments, the electronic controller 70 may determine when the control stick 216 is positioned within the deadband 258 and disregard any movement of the control stick 216 when determining the output signals. Alternatively, in some embodiment, no control signal or a null control signal is sent to the electronic controller 70 when the control stick 216 is positioned within the deadband 258. The deadband 258 enables the control stick 216 to have some movement around the origin without affecting movement of the aircraft 10. For example, if the control stick 216 is accidentally bumped or shifted due to vibrations of the aircraft 10, it may undesirable to allow these minor movements of the control stick 216 to affect the control of the aircraft 10. Once the control stick 216 is displaced outside of the deadband 258, movement of the control stick 216 will again affect the control of the aircraft 10.

Furthermore, the electronic controller 70 may operate the aircraft 10 according to different control modes depending on whether the control stick 216 is positioned within or outside of the deadband 258. The control mode relates to where control of a particular parameter lies (e.g., with the pilot or with the electronic controller 70). For example, the electronic controller 70 may operate the aircraft 10 according to a first control mode when the control stick 216 is positioned outside of the deadband 258, and may control the aircraft 10 according to a second control mode when the control stick 216 is positioned within the deadband 258. In some embodiments, the control mode utilized when the control stick 216 is outside of the deadband 258 is a "pilot command" type of control mode in which greater control is provided to the pilot via the control stick 216. On the other hand, the control mode utilized when the control stick 216 is within the deadband 258 is a "controller hold" type of control mode in which greater control is provided to the electronic controller 70. For example, the command control mode may be a rate command control mode or an attitude command control mode. When in a command type of control mode, the electronic controller 70 operates the aircraft 10 based on an input from the pilot via the control stick 216. When in a hold type of control mode, the electronic controller 70 operates the aircraft 10 by maintaining a parameter of the aircraft 10 that was last achieved when the control stick 216 entered the deadband 258. For example, the hold control mode may be an attitude hold or a rate hold control mode, in which the electronic controller 70 maintains the attitude or the rate, respectively, that was last achieved when the control stick 216 entered the deadband 258.

As the control stick 216 moves into and out of the deadband 258, the electronic controller 70 may switch back and forth between a first control mode, such as a command control mode, and a second control mode, such as a hold control mode. For example, the electronic controller 70 may operate the aircraft 10 according to a "rate command, attitude hold" control mode. In this control mode, the electronic controller 70 operates the aircraft 10 according to a rate command control mode when the control stick 216 is positioned outside of the deadband 258, and operates the aircraft 10 according to an attitude hold command control mode when the control stick 216 is positioned within the deadband 258. The rate command control mode enables the pilot to input the desired rate of the aircraft 10, while the attitude hold control mode enables the electronic controller 70 to maintain (or hold) the aircraft 10 at the attitude it was in when the control stick 216 entered the deadband 258.

In addition to operating the aircraft 10 according to different control modes, such as a command control mode (i.e., pilot command mode) and a hold control mode (i.e., a controller hold mode), the electronic controller 70 may operate the aircraft 10 according to different operating modes. The operating mode indicates which parameter is being commanded by the pilot via the control stick 216, and which parameter is being held (or controlled) by the electronic controller 70. Each operating mode includes a combination of control modes, such as a command mode and a hold mode. For example, a "rate command, attitude hold" operating mode includes a pilot rate command control mode in combination with a controller attitude hold control mode.

The electronic controller 70 may control the aircraft 10 according to several different operating modes. In some embodiments, operating modes correspond to methods of controlling an attitude of the aircraft 10 (e.g., the amount of tilt of the aircraft left and right). For example, in an "attitude command" type of operating mode, the attitude of the aircraft 10 is controlled directly based on displacement of the control stick 216 from the origin. When in an attitude command mode, the pilot directly controls the attitude of the aircraft 10 via the control stick 216 while the electronic controller 70 maintains (or holds) one of the other parameters of the aircraft 10, such as another attitude parameter or a velocity of the aircraft 10. When in the attitude command operating mode, a pilot of the control stick 216 holds the control stick 216 at the corresponding position to maintain a specific attitude. When the pilot releases the control stick 216, the control stick 216 will return to the origin and the aircraft 10 will shift towards a neutral attitude. The attitude command operating mode includes an attitude command mode (i.e., pilot attitude control), which may be combined with different types of hold control modes (i.e., controller hold modes), such as a rate control mode or an attitude control mode.

In some embodiments, the aircraft 10 is controlled according to a "rate command" type of operating mode. In the rate command operating mode, the angular rate of the aircraft 10 (i.e., the pitch roll) is controlled based on displacement of the control stick 216 from the origin. Specifically, the derivative of the attitude of the aircraft 10 is controlled based on displacement of the control stick 216. When in a rate command mode, the pilot directly controls the rate of the aircraft 10 via the control stick 216 while the electronic controller 70 maintains (or holds) one of the other parameters of the aircraft 10, such as the attitude of the aircraft 10. The rate command operating mode includes a rate command mode (i.e., pilot rate control), which may be combined with different types of hold control modes (i.e., controller hold modes), such as an attitude control mode.

Displacement of the control stick 216 in the forward (or positive) direction may add to the angular rate, and displacement of the control stick 216 in the backward (or negative) direction may subtract from the angular rate. Similarly, displacement of the control stick 216 towards the left direction or the right direction will add or subtract from the angular rate of the aircraft in the left and right directions. When the control stick 216 is returned to the origin position, the angular rate is maintained at its set value. For example, the control stick 216 may be moved to the right to initiate a right roll of the aircraft 10 or moved to the left to initiate a left roll of the aircraft 10. The farther right or left the control stick 216 is displaced, the greater the right or left roll rate of the aircraft 10, respectively. To reduce the rate at which the aircraft 10 is rolling left or right, the pilot displaces the control stick 216 in the opposite direction (e.g., displaced towards the left to reduce a right roll rate). When in the rate operating mode, the pilot displaces the control stick 216 to initiate a rate command, and then releases the control stick 216, allowing the control stick 216 to return to the origin. The rate command will remain active even after the control stick 216 returns to the origin. In order to remove or alter the rate command, the pilot displaces the control stick 216 from the origin to initiate a new rate command.

The electronic controller 70 may switch between different operating modes depending on the circumstances or pilot preferences. Each operating mode requires different movements from the pilot of the aircraft 10 and has different benefits. For example, in the attitude command operating mode, the pilot performs larger movements of the control stick 216 (i.e., greater displacement of the control stick 216 from the origin), and may hold the control stick 216 in a given position for an extended period of time in order to maintain the aircraft 10 at a desired attitude. In the rate command operating mode, however, the control stick 216 may be displaced only at small amounts, and may be primarily located near the origin position. Depending on which operating mode is in use, the electronic controller 70 may switch between control modes more or less frequently. For example, when in an attitude operating mode, the control stick 216 is more often positioned away from the origin, and may move into and out of the deadband 258 less frequently, resulting in fewer switches between control modes. On the other hand, when in a rate command operating mode, the control stick 216 is generally positioned close to the origin and the deadband 258, and may move into and out of the deadband 258 more frequently, resulting in more frequent switching between control modes.

Furthermore, in some instances, the electronic controller 70 may adjust or remove/deactivate the deadband 258. Although the deadband 258 is beneficial in certain instances, for example, to avoid inadvertent movement of the control stick 216, the deadband 258 may also be inhibiting at times. For example, when operating in a rate command operating mode, it may be desirable to reduce the size of the deadband 258 or remove the deadband 258 altogether to reduce the number of times the electronic controller 70 switches control modes. As discussed, operating in rate command operating mode results in more frequent switching between control modes. Therefore, a pilot maintains control the aircraft 10 (i.e., remains in pilot command control mode) by moving the control stick 216 precisely around the deadband 258. When the control stick 216 enters the deadband 258, control of the aircraft 10 is switched to a hold control mode where the electronic controller 70 maintains a parameter of the aircraft 10. If the pilot wants to adjust the aircraft 10, such as adjusting the trim, the pilot moves the control stick 216 out of the deadband 258 to switch the control mode to a command control mode. Once back in command control mode, the pilot may again control the command parameter via movement of the control stick 216. Frequent switching of control modes when the control stick 216 enters the deadband 258 may not always be preferable.

Accordingly, it may be desirable to selectively reduce the size of the deadband 258 or deactivate the deadband 258 depending on the operating mode currently in use or a pilot's preferences. The size of the deadband 258 may be defined by the space extending between the central axis 262 and a predetermined angular distance 270 from the central axis 262. In other words, the central axis 262 extends through the center of the deadband 258 and the angular distance 270 defines the outer perimeter of the deadband 258. The size of the deadband 258 may be adjusted by changing the angular distance 270 of from the central axis 262. For example, the size of the deadband 258 may be defined by the space between the central axis 262 and a first angular distance 270A from the central axis 262, as shown in FIG. 3. In some embodiments, the first angular distance 270A may be greater than or equal to 2% of the maximum angular displacement 266 of the control stick 216 relative to the central axis 262. In other embodiments, the first angular distance 270A may be greater than or equal to 5% of the maximum angular displacement 266 of the control stick 216 relative to the central axis 262.

The size of the deadband 258 may be adjusted (i.e., increased or decreased) such that it is defined by the space between the central axis 262 and a second angular distance 270B, which is different from the first angular distance 270A. When reducing the size of the deadband 258, the second angular distance 270B will less than the first angular distance 270A, as shown in FIG. 4. When increasing the size of the deadband 258, the second angular distance 270B will be greater than the first angular distance 270A. In some embodiments, the second angular distance 270B may be less than or equal to 2% of the maximum angular displacement 266 of the control stick 216 relative to the central axis 262. In other embodiments, the second angular distance 270B may be less than or equal to 5% of the maximum angular displacement 266 of the control stick 216 relative to the central axis 262. Furthermore, the deadband 258 may be deactivated (i.e., removed) by changing the angular distance 270 from the central axis 262 to be 0 degrees from the central axis 262, as shown in FIG. 5. When the deadband 258 is deactivated, the electronic controller 70 operates the aircraft 10 according to the command control mode, whereby the pilot retains control of the aircraft 10.

In embodiments where an electronic detent is used to define the deadband 258, the deadband 258 may be adjusted by changing the size of the detent. Specifically, the electronic controller 70 may adjust the size of the deadband 258 by controlling one or more inceptors 204 to adjust the size of the electronic detent. For example, the electronic controller 70 may create the electronic detent by controlling the inceptors 204 to begin applying a force (or increasing the applied force) against the control stick 216 once the control stick 216 is reaches the outer perimeter of the deadband 258 as defined by the first angular distance 270A. In order to adjust the size of the deadband 258, the electronic controller 70 may control the inceptors 204 to begin applying the force (or increasing the applied force) when the control stick 216 reaches the second angular distance 270B. When the size of the deadband 258 is reduced, the inceptors 204 will apply a force at a smaller displacement of the control stick 216. Additionally, the deadband 258 may be deactivated by controlling the inceptors 204 to remove the electronic detent.

Furthermore, in some embodiments, adjustment of the deadband 258 may be initiated manually, while in other embodiments, adjustment of the deadband 258 may be automatically initiated. A pilot may manually initiate an adjustment of the deadband 258 by actuating the button 240 on the control stick 216 to send a signal to the electronic controller 70 to adjust the deadband 258. Actuation of the button 240 may either reduce the size of the deadband 258 or deactivate it. In some embodiments, releasing the button 240 may increase the size of the deadband 258 or reactivate it. In this embodiment, the pilot must continue to hold the button 240 in an actuated position in order to maintain the adjusted or deactivated deadband 258. In other embodiments, releasing the button 240 retains the adjusted or deactivated state of the deadband 258. In order to return the deadband 258 to the original size or reactivate the deadband 258, the pilot actuates the button 240 again. For example, the button 240 may be a toggle switch, a rotating dial, or a slide switch that is maintained in an actuated position. Furthermore, in some embodiments, adjustment of the deadband 258 may only be initiated when the control stick 216 is positioned within the deadband 258. The pilot may move the control stick 216 into the deadband 258 before actuating the button 240 or may actuate the button 240 and then shift the control stick 216 into the deadband 258 to initiate the deadband 258 adjustment. The electronic controller 70 may determine whether the control stick 216 is positioned within the deadband 258 before adjusting the deadband 258 in response to the button 240 being pressed. The pilot may manually adjust the deadband 258 based on personal preference, the current operational mode, the current control mode, etc.

Alternatively, the electronic controller 70 may automatically initiate an adjustment of the deadband 258. In some embodiments, the deadband 258 is automatically controlled based on the current operational mode or control mode. The electronic controller 70 may monitor the one or both the operational mode and/or control mode to determine when the deadband 258 should be adjusted. For example, the controller may automatically adjust the deadband 258 when the aircraft 10 changes from an attitude command operational mode to a rate command operational mode. Alternatively, or in addition, the electronic controller 70 may monitor other factors, such as the position of the control stick 216, or the frequency in which the control stick 216 enters and exists the deadband 258 within a predetermined amount of time.

Figure 6:
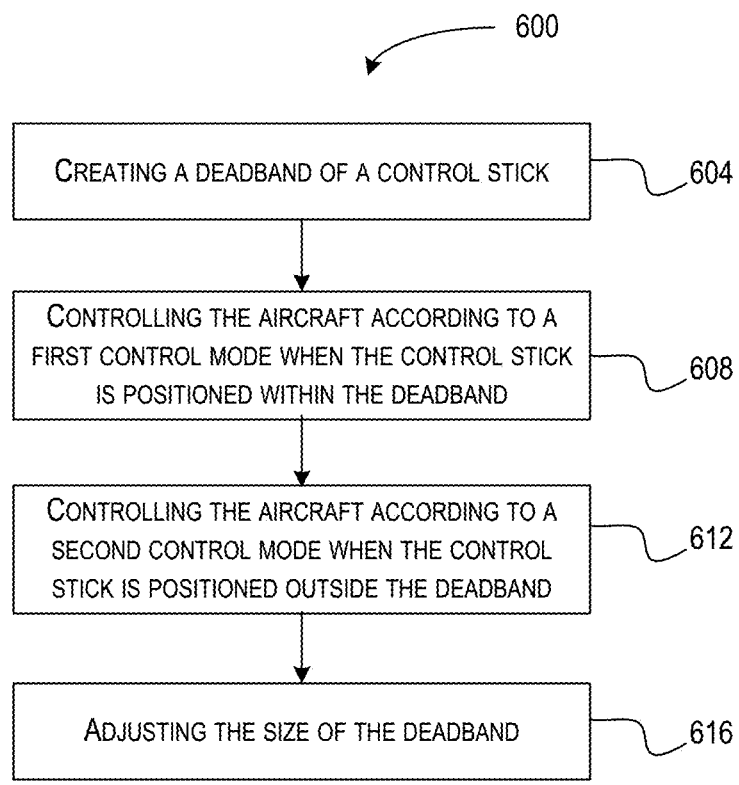
FIG. 6 is a flow chart illustrating a method of operating an aircraft based on movement of a control stick.

FIG. 6 provides a method 600 of operating an aircraft based on movement of a control stick, including controlling a deadband 258 of a control stick. The method 600 includes creating a deadband 258 of the control stick 216 (step 604), where the deadband 258 extends between the central axis 262 and a first angular distance 270A from the central axis 262. In some embodiments, the deadband 258 is created by controlling inceptors to define an electronic detent. The aircraft 10 is controlled according to a first control mode in response to the control stick 216 being positioned within the deadband 258 (step 608). The first control mode may be a hold mode (i.e., a controller hold mode). The aircraft 10 is controlled according to a second control mode in response to the control stick 216 being positioned outside of the deadband 258 (step 612). The second control mode may be a command mode (i.e., a pilot command mode). The size of the deadband 258 is adjusted such that the deadband 258 extends between the central axis 262 and a second angular distance 270B from the central axis 262 (step 616). In some embodiments, the second angular distance 270B is zero degrees from the central axis 262 such that the deadband 258 is removed, or deactivated.

Figure 7:
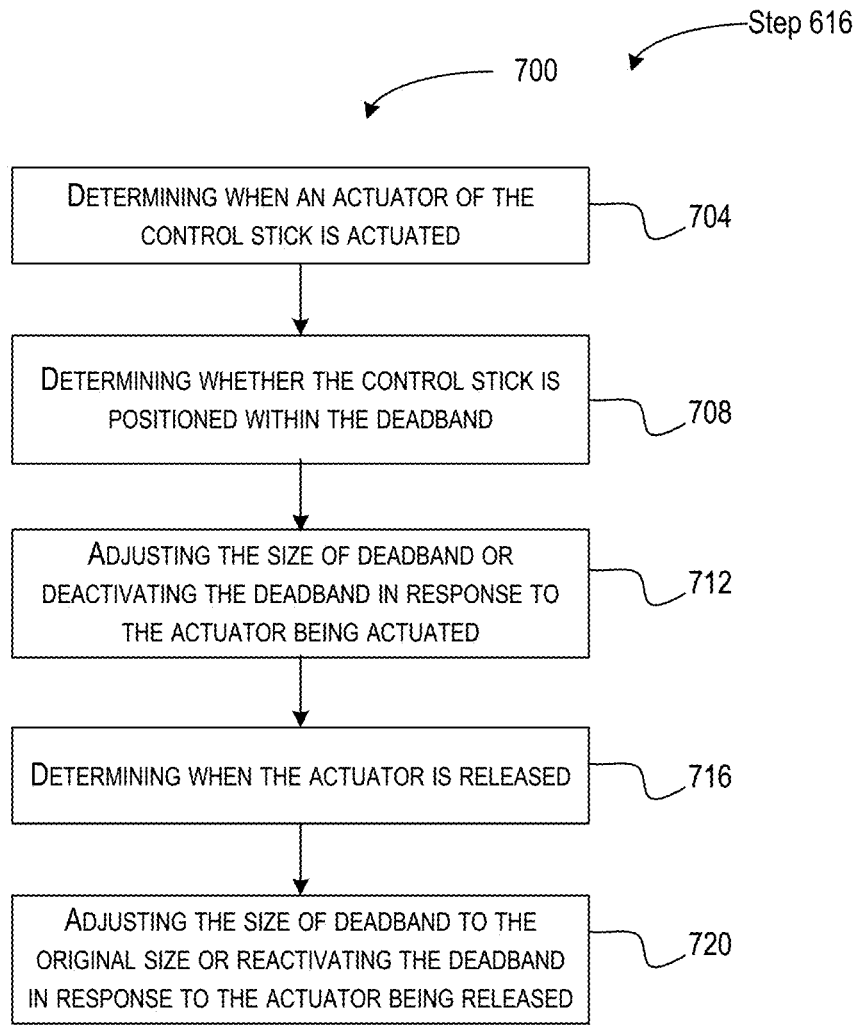
FIG. 7 is a flow chart illustrating a method of adjusting the deadband of a control stick.

FIG. 7 provides on embodiment of a method 700 of adjusting the deadband 258 (step 616). The method 700 includes determining when an actuator of the control stick 216 is actuated (step 704) and determining whether the control stick 216 is positioned within the deadband 258 (step 708). When the electronic controller 70 determines that both steps 704 and 708 are met, the electronic controller 70 may adjust the size of the deadband 258 (step 712). Adjusting the size of the deadband 258 may include increasing or decreasing the size of the deadband 258 or deactivating the deadband 258. The electronic controller 70 may then determine when the actuator of the control stick 216 is released (step 716). In instances when the button 240 is a toggle button 240, a slide button 240, or a rotating button 240, the electronic controller 70 may instead determine when the actuator of the control stick 216 is depressed again or returned to its original position. In response to the button 240 being released, the electronic controller may then adjust the size of the deadband 258 to return to its original size or reactivate the deadband 258 (step 720).

Embodiments disclosed herein are primarily for exemplary purposes. it should be understood that alternative embodiments or various combinations of features described herein may be implemented.

Various features and advantages of the embodiments described herein are set forth in the following claims.

What is claimed is:

1. A control system for an aircraft, the control system comprising:
a control stick biased towards a neutral position defined along a central axis and pivotable to a plurality of angular positions relative to the central axis; and
a controller coupled to the control stick, the controller including an electronic processor and a memory, the controller configured to:
create a deadband of the control stick, the deadband extending between the central axis and a first angular distance from the central axis,
control the aircraft according to a first control mode when the control stick is positioned within the deadband,
control the aircraft according to a second control mode when the control stick is positioned outside of the deadband, and
adjust a size of the deadband such that the deadband extends between the central axis and a second angular distance from the central axis.

2. The control system of claim 1, wherein the second angular distance is less than the first angular distance.

3. The control system of claim 1, wherein the second angular distance is 0 degrees from the central axis such that the deadband is removed.

4. The control system of claim 1, wherein the first angular distance is greater than 2% of a maximum angular displacement of the control stick relative to the central axis, and wherein the second angular distance is less than 2% of the maximum angular displacement of the control stick relative to the central axis.

5. The control system of claim 1, further comprising one or more inceptors coupled to the control stick and configured to apply a force to the control stick, wherein the controller creates the deadband by controlling the force applied by the one or more inceptors, and wherein the controller adjusts the size of the deadband by adjusting the force applied by the one or more inceptors.

6. The control system of claim 1, wherein the control stick includes an actuator, and wherein the controller adjusts the size of the deadband in response to the actuator being actuated.

7. The control system of claim 6, wherein the controller is further configured to determine whether the control stick is positioned within the deadband while the actuator is actuated.

8. The control system of claim 1, wherein the controller is further configured to operate the aircraft according to a first operating mode and a second operating mode, and wherein the controller automatically adjusts the size of the deadband in response to a change in operating modes from the first operating mode to the second operating mode.

9. The control system of claim 8, wherein the first operating mode is an attitude command mode and wherein the second operating mode is a rate command operating mode.

10. A method of operating an aircraft based on movement of a control stick, the method comprising:
creating a deadband of the control stick, the deadband extending between the central axis and a first angular distance from the central axis;
controlling, in response to the control stick being positioned within the deadband, the aircraft according to a first control mode;
controlling, in response to the control stick being positioned outside of the deadband, the aircraft according to a second control mode; and
adjusting a size of the deadband such that the deadband extends between the central axis and a second angular distance from the central axis.

11. The method of claim 10, wherein the second angular distance is less than the first angular distance.

12. The method of claim 10, wherein the second angular distance is 0 degrees from the central axis such that the deadband is removed.

13. The method of claim 10, wherein the first angular distance is greater than 2% of a maximum angular displacement of the control stick relative to the central axis, and wherein the second angular distance is less than 2% of the maximum angular displacement of the control stick relative to the central axis.

14. The method of claim 10, wherein creating the deadband includes controlling one or more inceptors to create an electronic detent, the one or more inceptors being coupled to the control stick and configured to apply a force to the control stick to create the electronic detent, and wherein adjusting the size of the deadband includes controlling the one or more inceptors to adjust the force applied to the control stick.

15. The method of claim 10, wherein adjusting a size of the deadband includes adjusting the size of the deadband in response to an actuator of the control stick being actuated.

16. The method of claim 15, further comprising determining whether the control stick is positioned within the deadband while the actuator is actuated.

17. The method of claim 10, wherein adjusting a size of the deadband includes automatically adjusting the size of the deadband in response to a change in operating modes.

18. A method for controlling an aircraft via a control stick having an actuator, the method comprising:

controlling, in response to the control stick being positioned within a deadband, the aircraft according to a first control mode;

controlling, in response to the control stick being positioned outside of the deadband, the aircraft according to a second control mode;

detecting when an actuator of the control stick is actuated;

deactivating, in response to the actuator being actuated, the deadband of the control stick; and controlling, in response to the deadband being removed, the aircraft according to the second control mode.

19. The method of claim 18, further comprising reactivating, in response to the actuator being released, the deadband of the control stick.

20. The method of claim 18, wherein deactivating the deadband further includes determining whether the control stick is positioned within the deadband when the actuator is actuated.

* * * * *